Sept. 13, 1932.  J. M. BUTLER  1,877,444
FISHLINE DRYING REEL
Filed May 22, 1929
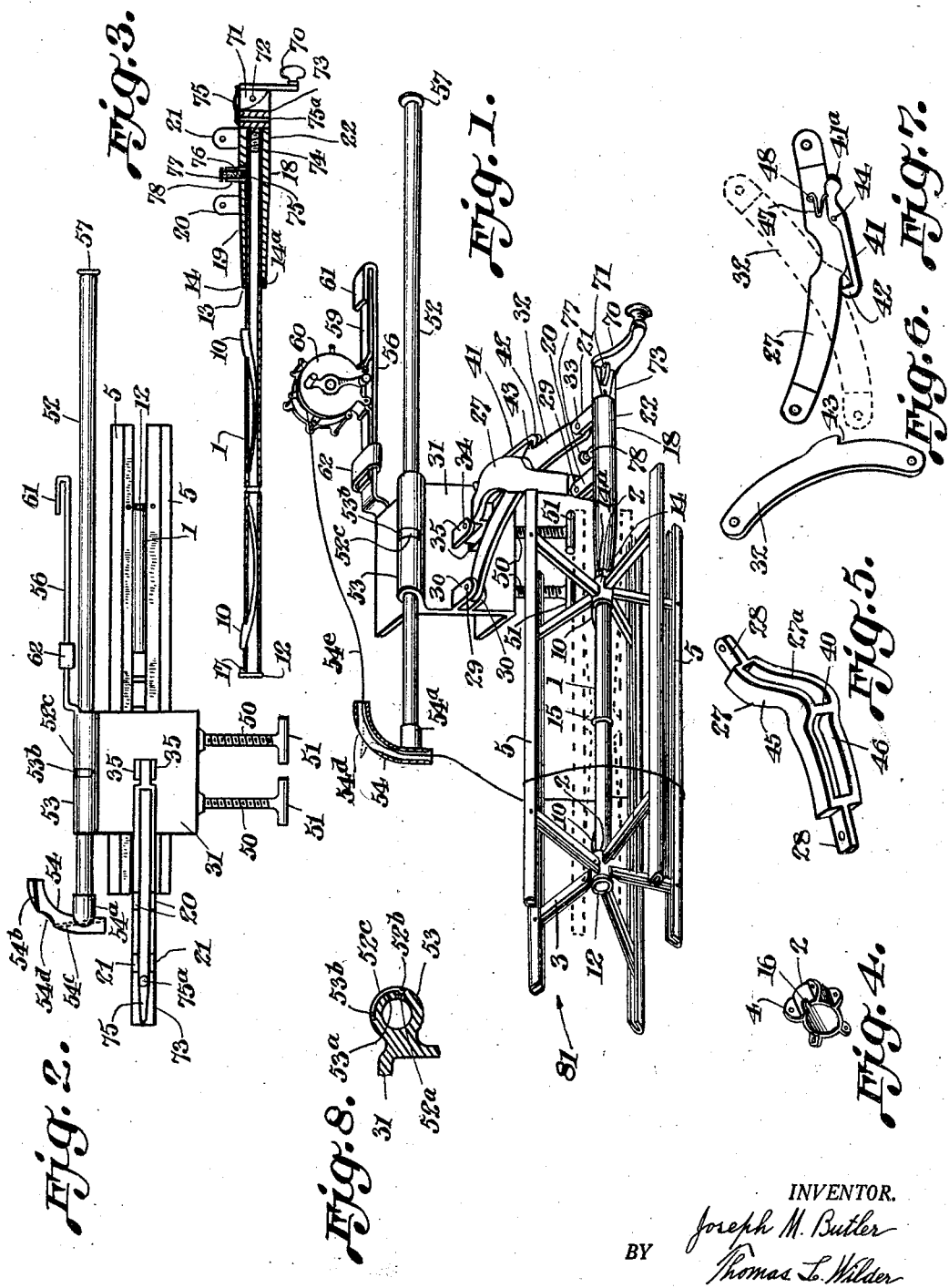
INVENTOR.
Joseph M. Butler
BY Thomas L. Wilder
ATTORNEYS.

Patented Sept. 13, 1932

1,877,444

UNITED STATES PATENT OFFICE

JOSEPH M. BUTLER, OF VERNON, NEW YORK

FISHLINE DRYING REEL

Application filed May 22, 1929. Serial No. 365,180.

My invention relates to a fish line drying reel, and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a device for drying a fishing line. Such a device will be found serviceable particularly to fishermen after using the line, whereby to dry the same after fishing. Furthermore, the device is of the knockdown variety to enable the fisherman to carry the same with him on his fishing trips for immediate use after each day or occasion on which he fishes, whereby to prevent the fishing line from rotting.

The object will be understood by referring to the drawing in which

Fig. 1 is a perspective view of the device showing the same in extended position.

Fig. 2 is an elevational view showing the device in folded or knock down position.

Fig. 3 is a detail view showing a central longitudinal section of an axle and immediate parts used.

Fig. 4 is a detail enlarged view of a sliding sleeve employed.

Fig. 5 is a detail view showing a perspective of a connecting link employed.

Fig. 6 is a detail view showing a perspective of a cooperating link employed.

Fig. 7 is a detail view showing a plan with parts in section of the link illustrated in Fig. 5 and immediate parts.

Referring more particularly to the drawing the device embodies a rotary reel comprising the hollow axle 1 on which is mounted sliding sleeves 2, 2. Spokes 3 are pivotally united to upstanding lugs 4 made integral with each of the sleeves 2 at one end and to horizontal bars 5 at the other. Spokes 3 and bars 5 are made of channel metal, and collapse in the same manner as an umbrella frame. Sleeves 2 are held in outermost position, whereby spokes 3 are in radial or expanded location with respect to said sleeves 2 by umbrella springs 10, 10 housed in the hollow interior of axle 1 and by head 12 at the end of axle 1 and shoulder 13 made by thrust ring 14 at an intermediate position on axle 1 at the other. Ring 14 is held in place by pin 14a and limits the movement of tubular member 18 hereinafter described. Sleeves 2 can be released from their respective extended positions by depressing springs 10, 10 and moving said sleeves 2, 2 toward each other. Ring 15 held in an annular groove made in axle 1 limits the inward movement of sleeve 2, 2. One of the sleeves 2, 2 has an open recess 16 adapted to engage pin 17 upstanding from hollow axle 1, whereby to cause the drying reel to revolve with said axle 1. Tubular bearing 18 is mounted on axle 1. It tapers somewhat from its location adjacent ring 14 to about the location 19 or a little less than half its length. Bearing lugs 20, 20 and 21, 21 are made integral with the enlarged part 22 of member 18 and are intended to pivotally mount a collapsible bracket consisting of arc shaped link 27 and link 32. The reduced ends 28 of link 27 are pivoted at either end to shafts 29 carried in said lugs 20 and in bearing lugs 30, 30 formed integral with the channel portion 31 of the clamp. Furthermore arc shaped link 27 is made with a central open recess 27a through which is projected the complementary link 32 that is pivoted at one end to shaft 33 held rigidly in bearing lugs 21, 21 on bearing 18 and at the other to shaft 34 held rigidly in bearing lugs 35, 35 formed integral with channel portion 31 of the clamp. Said shafts 29, 33 and 34 are held stationary in their respective bearing members. Links 27 and 32 permit the swinging of the reel about bearing lugs 35, 35 and 30, 30 as a fulcrum into the full line position illustrated in Fig. 2 in which folded position the reel will be past center and locked within the channel portion 31 of the clamp.

The means for locking links 27 and 32 in extended position illustrated in Fig. 1 embodies a wall 40 formed integral with link 27 and a detent or spring pressed latch 41 having a head 42 adapted to engage the shoulder 43 made integral with link 32. Detent 41 is fulcrumed on shaft 44 carried in the upper 45 and lower 46 portions of link 27. A flat spring 47 is wound about a spindle 48 held in bearings in portion 45 and 46 of link 27. Its free end pressed against the adjacent surface of detent 41 to hold the engaging head 42 in engaging position. The opposite end of detent 41 is enlarged at 41a to project slightly beyond the edge of link 27, whereby to aid in rocking said detent 41 on its pivot to releasing position.

Channel portion 31 of the clamp is provided with clamping screw bolts 50, 50 having elongated heads 51, 51 to aid in turning said wing screws into engaging or disengaging position.

A distributing rod 52 is mounted to slide freely in sleeve 53 made integral with channel portion 31 of the clamp. In order to prevent the rod 52 from sliding too freely in sleeve 53, a fibre pad 52a is held against its surface by the turned over end 52b of flat spring 52c. Flat spring 52c is mounted in a reduced recess 53a of sleeve 53. Its end 52b projects into an aperture made through sleeve 53 and it rests on pad 52a causing a tension thereon against rod 52. Said spring is held at its opposite end by a rivet 53b fixed by a drive fit in an aperture in sleeve 53.

A tubular self feeding line guide 54 preferably made of stainless steel hardened to prevent corrosion is mounted on the end of sleeve 54a that is welded or otherwise fastened to the end of rod 52. Slots 54b and 54c made at an angle to the axis of guide 54 and open recess 54d aid in threading the fishing line 54e thereto. Guide 54 serves also as a handle for actuating rod 52. Head 57 fixed to one end of rod 52 and the edge of sleeve 54a will limit the extent of longitudinal movement of rod 52. Said limits will localize the distribution of the fish line to the horizontal rod 5 of the drying reel and thereby anticipate the falling of the line beyond either end of the reel. Moreover, a fish line reel holder is provided. It comprises an offset arm or rest 56 formed integral with channel portion 31. Said arm 56 is annular in cross section to conform to the annular base part 59 of reel 60. The end of arm 56 is doubled back at 61 to provide an open slot to engage one end of base 59. A sliding ring 62 is adapted to engage and hold the opposite end of base 59.

The means for rotating the drying reel embodies a crank handle 70 adapted to fold down in parallel relation to bearing member 18. Handle 70 has a lug 71 pivotally mounted at 72 to the bifurcated end of member 73, which is reduced and threaded at 74 to the end of axle 1. A flat spring 75 having one end fixed by a pin 75a to member 73 and its free end resting against the lower surface of lug 71 is adapted to hold said handle in either operating or knock down positions as illustrated in Fig. 3. A friction brake comprising a fibre pad 75 is adapted to prevent axle 1 from turning too freely. The tension of the brake can be adjusted by increasing the pressure on spring 76. This is effected by turning thumb screw 77 in sleeve 78 that is screw mounted to member 18. Sleeve 78 is located between lugs 20, 20 and 21, 21.

In order to operate the device the user first pulls the drying reel out from its folded position shown in Fig. 2 to the position shown in Fig. 1. Detent 41 will automatically engage shoulder 43 to lock links 27 and 32 in projected position. He then clamps member 31 to the edge of a nearby table or other convenient object. The drying reel can be expanded pulling outward on two or more of the horizontal bars 5. Sleeves 2, 2 will slip over springs 10, 10 and be held thereby and by cooperating head 12 at one end of axle 1 and by ring 14 as above explained. One end of the fishing line 54e will be threaded through guide 54 and secured to one of the horizontal bars 5 of the drying reel. The drying reel will be rotated then by turning crank handle 70, which has been drawn out into operative position illustrated in Fig. 1. Simultaneously with the turning of the drying reel, the user will reciprocate distributing rod 52 by means of guide 54 as a handle, whereby to cause an even winding of line 54e over the entire length of horizontal bars 5. The reel, because of its skeleton framework, will expose the fishing line to the air from all angles both from the inside as well as the outside. The line 54e can be rewound onto reel 60 after it is dry. The drying reel can be collapsed by pressing on springs 10, 10 and on horizontal bars 5 and subsequently pressing inward on part 41a of detent 41 to release links 27 and 32 from extended position. The drying reel will be now collapsed and will be swung on shafts 29 and 34 as a fulcrum into full line position illustrated in Fig. 2 in which collapsed position it will be slightly past center, whereby to hold the drying reel in folded position within portion 31 of the clamp. To again swing the drying reel into extended or open position the user will find it convenient to grasp the clamp with his left hand and with his thumb resting over reel seat 56 and two first fingers pressing slightly against the back surface of portion 31 of the clamp, at the same time exerting a pull on horizontal bars 5 of the drying reel.

When it is desirable to store the fish line without rewinding onto reel 60 the same can be removed directly from the drying reel in skein formation by sliding the line 54e endwise off the free end 81 of the drying reel. To facilitate the removal of the line 54e in this manner it will be found expedient to partially collapse the drying reel.

Having thus described my invention what I claim as new and desire to secure by Letters Patent is as follows:

1. In a fish line drying reel, a collapsible reel for holding a fish line, means for rotating said reel, a clamp for holding said reel in operative position, links pivotedly connecting said reel with said clamp whereby to swing said reel into inoperative position and a sliding member mounted on said clamp for distributing said fish line on said reel.

2. In a fish line drying reel, a member for holding a fish line, a clamp for holding said member in operative position, links for connecting said member to said clamp, whereby to permit said member to be moved into collapsible position and a sliding member mounted on said clamp to distribute said line on said reel.

3. In a fish line drying reel, a collapsible frame for holding said fish line, a clamp for holding said frame in extended position, links connecting said clamp with said frame, whereby said frame can be moved relative to said clamp, means on said clamp for holding a second reel containing a fish line wound thereon, and a rod slidingly mounted in respect to said clamp for distributing said fish line as it is wound on said first named frame.

4. In a fish line drying reel, a collapsible frame comprising bars connected to collapsible members, means for locking said collapsible members in predetermined position, a clamp for holding said collapsible frame in extended position, links connecting said clamp with said frame, whereby said frame can be moved relative to said clamp, means on said clamp for holding a second reel containing a fish line wound thereon, and a rod slidingly mounted on said clamp for distributing said fish line as it is wound on said collapsible frame.

5. In a fish line drying reel, a collapsible frame comprising bars connected to spokes, means for allowing said spokes to collapse, spring members for locking said spokes in predetermined position, a clamp for holding said collapsible frame in extended position, links connecting said clamp with said frame, whereby said frame can be moved relative to said clamp, means on said clamp for holding a second reel containing a fish line wound thereon, and a rod slidingly mounted on said clamp for distributing said fish line as it is wound on said collapsible frame.

6. In a fish line drying reel, a member for holding a fish line, a clamp for holding said member in position, interfitting links for connecting said member to said clamp, whereby to permit said member to be swung relative to said clamp.

7. In a fish line drying reel, a collapsible member for holding a fish line, a clamp for holding said collapsible member, interfitting links pivotally connecting said collapsible member to said clamp, whereby to permit said collapsible member to be moved relative to said clamp and a spring pressed latch pivotally mounted to one of said links for engaging a shoulder formed on the other link, whereby to hold said collapsible member in predetermined position.

In testimony whereof I have affixed my signature.

JOSEPH M. BUTLER.